W. R. DAVIS.
AIR BRAKE APPARATUS.
APPLICATION FILED JULY 23, 1913.

1,095,087.

Patented Apr. 28, 1914.
2 SHEETS—SHEET 1.

Witnesses
Edward J. Disney.
John J. McCarthy

Inventor
W. R. Davis
By Victor J. Evans
Attorney

W. R. DAVIS.
AIR BRAKE APPARATUS.
APPLICATION FILED JULY 23, 1913.

1,095,087.

Patented Apr. 28, 1914.
2 SHEETS—SHEET 2.

Witnesses
Edward J. Disney.
John J. McCarthy

Inventor
W. R. Davis
By Victor J. Evans
Attorney

UNITED STATES PATENT OFFICE.

WILLIAM R. DAVIS, OF COLUMBUS, OHIO.

AIR-BRAKE APPARATUS.

1,095,087.   Specification of Letters Patent.   Patented Apr. 28, 1914.

Application filed July 23, 1913. Serial No. 780,752.

*To all whom it may concern:*

Be it known that I, WILLIAM R. DAVIS, a citizen of the United States of America, residing at Columbus, in the county of Franklin and State of Ohio, have invented new and useful Improvements in Air-Brake Apparatus, of which the following is a specification.

This invention relates to improvements in air brake apparatus or systems and has particular application to what are known as double heading valves.

In carrying out the present invention, it is my purpose to provide a double heading valve whereby the engineer of the first or leading engine will have complete control of the air brake system exclusive of the engineer of the second engine and whereby the main air reservoir on the second engine will be automatically connected up with the train line air pipe when the engineer on the first engine has moved his brake valve to release position thereby enabling the pumps on both engines to restore the train line pressure. It is also my purpose to provide a double heading valve which will be controlled by the train pipe pressure and which when brought into service cuts off communication between the respective main reservoir and the train line air pipe when the brakes are applied; which, when the brakes are released, is operated by air pressure to open communication between the air reservoir with which it is connected and the train pipe, and which, when the train pipe pressure is restored, automatically maintains communication between the respective air reservoir and train pipe so that any leak in the train pipe may be compensated for, and then closes such connection when the train pipe pressure is reduced to effect an application of the brakes.

Furthermore, I aim to provide a double heading valve which may be readily and conveniently connected in an engine equipment and which may be cut out of service when one engine only is used.

With the above and other objects in view, the invention consists in the construction, combination and arrangement of parts hereinafter set forth in and falling within the scope of the claims.

Figure 1:
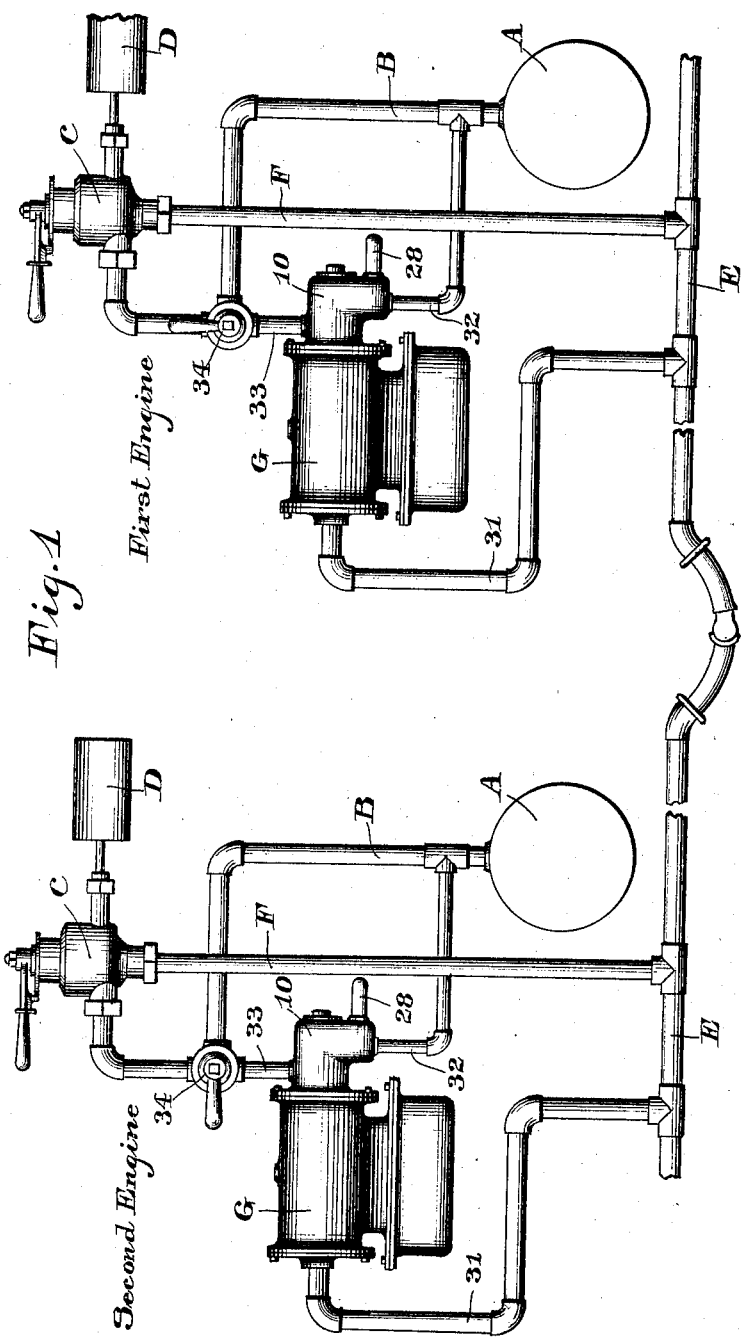
Figure 2:
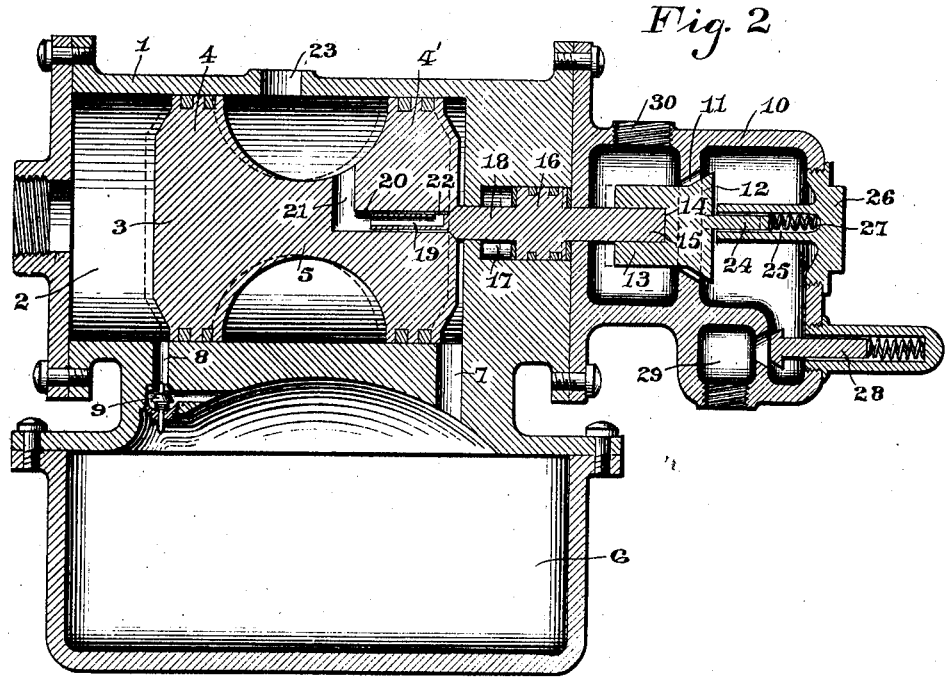
Figure 3:
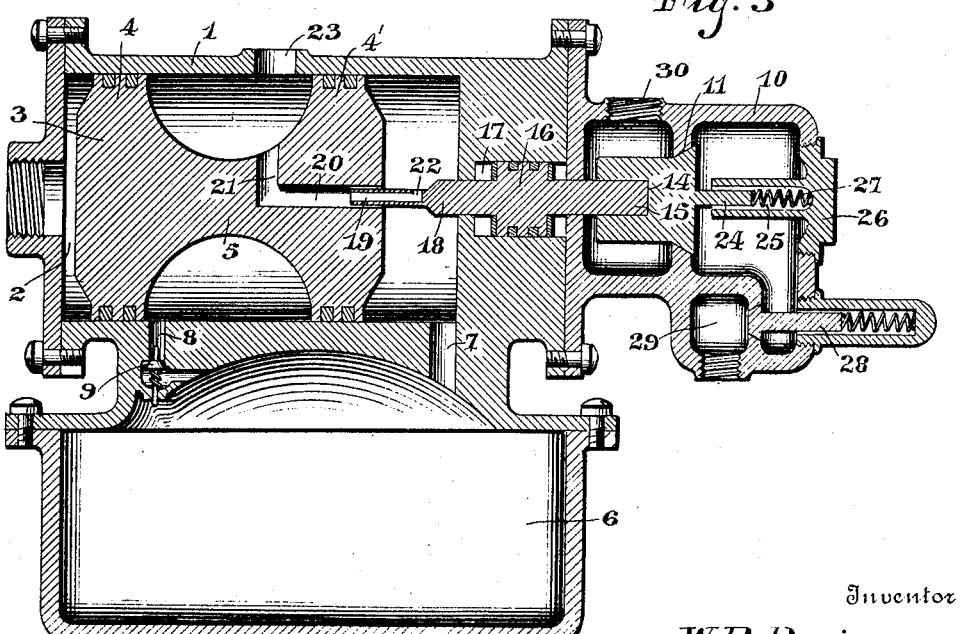

In the accompanying drawings; Figure 1 is a diagrammatic view showing my double header valve system applied to two engines. Fig. 2 is a vertical sectional view through one of the double header valves, the parts being shown in the position they occupy when the brakes are released and the train line being charged. Fig. 3 is a similar view showing the parts in the position they occupy when the brakes are applied.

In the practice of my invention, each engine is equipped with a double header valve properly connected in the brake system and when one engine only is used the double header valve in no way interferes with the operation of the brakes. When two or more engines are coupled to the same train, incident to the latter being long or heavy, the direct connection between the engineer's valve and the main air reservoir is left open on the first or leading engine, while on the other engine or engines, this connection is closed.

Referring now to the accompanying drawings in detail, A designates the main air reservoir on each engine connected by way of the usual pipe B with the engineer's valve C of any ordinary or preferred construction and equipped with an equalizing reservoir D, as usual. Connecting the engineer's valve C with the train line air pipe E is a pipe F.

My improved double heading valve is indicated at G and, in the present instance, comprises a cylindrical casing 1. Formed in the casing 1 is a piston chamber 2 in which is mounted for sliding movement a piston 3 composed in this instance of heads 4, 4' connected to each other through the medium of an integral web 5, such web holding the heads 4, 4' appropriately spaced apart. Suitably connected to the casing 1 is an air chamber 6 having communication with the end of the piston chamber behind the head 4' by way of a passage 7 disposed immediately adjacent to the respective end of the piston chamber, and adapted to have communication with the opposite end of such chamber by way of a passage 8 spaced an appropriate distance apart from the adjacent end or head of the chamber and controlled by the head 4 of the piston, the passage 8 being provided with a reducing valve 9. Suitably connected to one end of the casing 1 is a valve chamber 10 formed interiorly with a flange providing a valve seat 11 coaxial with the piston chamber 2 and designed to receive a valve disk 12 provided with a boss 13 having a bore 14 formed therein to receive the shank 15 carried by a head 16 slidably mounted within an opening or bore 17 formed in the adjacent end wall of the casing 1, the shank 15 on the head extending into the valve casing 10 and forming, in effect, a connection between the head 16 and the valve disk 12. The opposite side of the head 16 is equipped with a shank 18 projecting into the end of the piston chamber carrying the head 4' of the piston. The free end of this shank 18 is equipped with a tube 19 slidably disposed within a passage 20 formed centrally in the piston head 4' and opening into the space between the heads of the piston by way of a port 21 formed in the web 5. The end of the tube 19 within the passage 20 is open, while the opposite end of such tube, that is the end connected with the shank 18, is formed with a port 22 so that when the parts are in the position illustrated in Fig. 3, communication will be established between the end of the piston chamber behind the head 4' and the atmosphere by way of the port 22, the tube 19, the passage 20, the port 21, the space behind the heads of the piston and an exhaust port 23 formed in the side wall of the cylinder approximately centrally thereof. Extending outwardly from the face of the valve disk 12 opposite to that carrying the boss 13 is a stem 24 slidably disposed within a tube 25 carried by a plug 26 threadedly engaging an opening in the outer end wall of the valve casing 10, while interposed between the free end of the stem 24 and the confronting portion of the inner face of the plug 26 is a coiled expansion spring 27 acting normally to hold the valve 12 against its seat and in closed position. The numeral 28 designates an appropriate form of reducing valve controlling the inlet port 29 to the valve chamber 10, such port being formed in the valve chamber at the outer side of the valve disk 12, while a discharge port 30 is formed in the casing at the opposite side of such valve disk.

In practice, a pipe or connection 31 has one end tapped into the end of the piston chamber receiving the head 4 of the piston 3 and the opposite end connected with the train line air pipe E. Leading from the inlet port 29 of the valve chamber 10 is a pipe or connection 32 having the free end thereof tapped onto the pipe B immediately adjacent to the connection of the latter with the main air reservoir A, while leading from the discharge port 30 in the valve casing 10 is a pipe or connection 33 tapped onto the pipe B adjacent to the connection of the latter with the engineer's valve C and disposed in the juncture of the pipe 33 with the pipe B is a cut off cock 34 whereby the direct connection between the main air reservoir A and the engineer's brake valve C may be cut off and the main air reservoir connected up with the engineer's brake valve by way of the pipe 32, valve casing 10 and valve 33, the pipes 32 and 33 forming, in effect, a by-pass or shunt controlled by the valve in the valve casing 10.

In operation, when "running, double header", the cut off cock 34 on the second engine is moved to a position to cut off the direct connection between the main air reservoir and the engineer's brake valve and establish a connection between such reservoir and valve by way of the by-pass, while the cut off cock on the first or leading engine is left in normal position so that the direct connection between the main air reservoir and the engineer's brake valve is established. Normally, that is to say, when the brakes are released and the train line pressure at normal, the parts of the working double header valve or valves, as the case may be, are in the positions illustrated in Fig. 2. In this position of the parts, the piston 5 is at one end of the piston chamber 2 while the valve disk 12 is held open or away from its seat incident to the outer edge of the passage 20 engaging the shoulder formed at the junction of the shank 18 with the tube 19 and communication between the train pipe and the main air reservoir on the second engine established so that the pumps of both engines will assist each other in maintaining the train pipe pressure at normal. The piston 3, being disposed at this end of the piston chamber 2, the piston head 4 will have uncovered the port 8 whereby the train line air will pass through the port 8 and into the air chamber 6 whence such air will tend to flow into the piston chamber behind the piston head 4' by way of the port 7, the reducing valve 9 holding the pressure of the air within the chamber 6 below the train pipe pressure so that the pressure of the train line air against the outer face of the piston head 4 will hold the piston in normal position and the valve open.

Should the engineman on the first engine manipulate his brake valve so as to cause a reduction of the train line air pressure and an application of the brakes to the wheels of the train, the piston 5 will move to the left of the piston chamber, as illustrated in Fig. 3, incident to the expansion of the air within the air chamber and behind the head 4' of the piston, thereby cutting off communication between the air chamber 6 and the train line and permitting the air in the air chamber and behind the piston head 4' and in the chamber 6 to escape to the atmosphere by way of the port 22, the tube 19, passage 20, port 21 and the port 23. In this movement of the piston, the valve disk 12 is actuated to closed position under the action of the spring 27, so that it is impossible for the engineman on the second train to permit air to flow from the main air reservoir into the train line. Thus, the possibility of the engineman on the second engine holding the train line pressure at normal is eliminated.

When the pressure on the air chamber 6 is reduced to less than the train line air pressure the piston will be moved within the piston chamber to close the port 22 and so cut off communication between the air chamber and the atmosphere. On the contrary, when the engineman of the first engine manipulates his brake valve to open communication between the main air reservoir and the train line pipe so as to recharge the latter and release the brakes, the pressure from the main air reservoir on the first engine entering the train line passes into the piston chamber in advance of the piston head 4 and so slides the piston to the end of its path of movement whereby the outer face of the piston head 4 in engagement with the adjacent end of the shank 18 slides the head 16 and so imparts a similar movement to the shank 15 with the effect to move the valve disk 12 to open position, whereby communication between the main air reservoir on the second engine and the train line air pipe is established by way of the by-pass so that the second engine will assist the first engine in pumping up the train line and restoring the pressure therein to normal. As the piston moves to the right to open the valve controlling the by-pass, such piston uncovers the port 8 and the train line air flows into the chamber 6 by way of the reducing valve 9. When the train line pressure is restored, the pressure of the train line air on the outer face of the head 4 will hold the piston against movement under the action of the air within the chamber 6, incident to such air being under a lower pressure than the train line air, and consequently maintain the valve 12 open so that both main air reservoirs may take care of the train pipe pressure when the brakes are released.

From the foregoing description taken in connection with the accompanying drawings, the construction, mode of operation and manner of employing my invention will be readily apparent. It will be seen that I have provided a double heading valve which may be readily and conveniently applied to or installed in the brake system now in vogue, while ordinary engineer's valves can be employed and can be set to running, service, release, lap or any other usual position on the first engine and the engineman on the second engine cannot interfere with the first engine in applying the brakes without turning the cock 34 to establish a direct connection between the main air reservoir and the brake valve. When this is resorted to, the engineman on the second engine can, of course, apply or release the brakes, but as it is natural only for the engineman to grasp the handle of the brake valve C, it is hardly probable that he would open this cock without having tried to realize the situation and to only open the cock in case of emergency.

It will be understood, of course, that the brake equipments on both engines are equipped with air pressure gages so that both enginemen will know the condition of the pressure in the train pipe and in his main reservoir.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention.

I claim:

1. A double header valve comprising a casing, a piston chamber in said casing, an air chamber adapted to communicate with said piston chamber at both ends thereof, a piston in said chamber and controlling the communication between one end of the piston chamber and the air chamber, a valve chamber having one side connected to the train pipe and the opposite side connected with the main air reservoir, a valve in said chamber and controlling the flow of air from the main air reservoir to the train line, a connection between one end of said piston chamber and the train pipe whereby the piston will be moved longitudinally within its chamber to its limit of movement in one direction when the train pipe pressure is being restored, and means operable from said piston previous to the same reaching its limit of movement to open said valve whereby the communication between the respective main air reservoir and the train pipe will be established, said piston in its movement establishing communication between the train pipe end of the piston chamber and the air chamber whereby the train line air will pass into said air chamber.

2. A double header valve comprising a casing, a piston chamber in said casing, an air chamber adapted to communicate with said piston chamber at both ends thereof, a piston in said chamber and controlling the communication between one end of the piston chamber and the air chamber, a valve chamber having one side connected to the train pipe and the opposite side connected with the main air reservoir, a valve in said chamber and controlling the flow of air from the main reservoir to the train line, a connection between one end of said piston chamber and the train pipe whereby the piston will be moved longitudinally within its chamber to its limit of movement in one direction when the train pipe pressure is being restored, means operable from said piston previous to the same reaching its limit of movement to open said valve whereby the communication between the respective main air reservoir and the train pipe will be established, said piston in its movement establishing communication between the train pipe end of the piston chamber and the air chamber whereby the train line air will pass into said air chamber and behind said piston, to actuate the latter upon a reduction in train line pressure and means for exhausting the air from the rear side of said piston and establishing communication between such side of the piston and the atmosphere when the train line pressure is reduced.

3. A double header valve comprising a casing, a piston chamber in said casing, an air chamber adapted to communicate with said piston chamber at both ends thereof, a piston in said chamber and controlling the communication between one end of the piston chamber and the air chamber, a valve chamber having one side connected to the train pipe and the opposite side connected with the main air reservoir, a valve in said chamber and controlling the flow of air from the main air reservoir to the train line, a connection between one end of said piston chamber and the train pipe whereby the piston will be moved longitudinally within its chamber to its limit of movement in one direction when the train pipe pressure is being restored, means operable from said piston previous to the same reaching its limit of movement to open said valve whereby the communication between the respective main air reservoir and the train pipe will be established, said piston in its movement establishing communication between the piston chamber and the air chamber whereby the train line air will enter said air chamber and pass behind said piston to actuate the latter upon a reduction in train line pressure, and piston controlled means for exhausting the air from the rear side of said piston and establishing communication between such side of the piston and the atmosphere when the train line pressure is reduced.

4. A double header valve comprising a casing, a piston chamber in said casing, an air chamber adapted to communicate with said piston chamber at both ends thereof, a piston in said chamber and controlling the communication between one end of the piston chamber and the air chamber, a valve chamber having one side connected to the train pipe and the opposite side connected with the main air reservoir, a valve in said chamber and controlling the flow of air from the main air reservoir to the train line, a connection between one end of said piston chamber and the train pipe whereby the piston will be moved longitudinally within its chamber to its limit of movement in one direction when the train pipe pressure is being restored, means operable from said piston previous to the same reaching its limit of movement to open said valve whereby the communication between the respective main air reservoir and the train pipe will be established, said piston in its movement establishing communication between the train pipe end of the piston chamber and the air chamber whereby the train line air will pass into said air chamber, and a reducing valve in the path of the train line air whereby the pressure of the latter within said air chamber will be below the normal train line pressure.

In testimony whereof, I affix my signature in presence of two witnesses.

WILLIAM R. DAVIS.

Witnesses:
NATHAN GUMBLE,
HARRY V. FOX.

---

Copies of this patent may be obtained for five cents each, by addressing the "Commissioner of Patents, Washington, D. C."